Dec. 12, 1950     M. RAVEAU     2,533,895
WHEELED ATTACHMENT FOR BOATS

Filed Aug. 2, 1946     3 Sheets—Sheet 1

INVENTOR.
MARCEL RAVEAU
BY
*[signature]*
ATTORNEY

Dec. 12, 1950     M. RAVEAU     2,533,895
WHEELED ATTACHMENT FOR BOATS

Filed Aug. 2, 1946     3 Sheets-Sheet 2

INVENTOR.
MARCEL RAVEAU
BY
ATTORNEY

Dec. 12, 1950 — M. RAVEAU — 2,533,895
WHEELED ATTACHMENT FOR BOATS
Filed Aug. 2, 1946 — 3 Sheets-Sheet 3

INVENTOR.
MARCEL RAVEAU
BY
*Colton Holschek*
ATTORNEY

Patented Dec. 12, 1950

2,533,895

UNITED STATES PATENT OFFICE 2,533,895

WHEELED ATTACHMENT FOR BOATS

Marcel Raveau, Lindenhurst, N. Y.

Application August 2, 1946, Serial No. 688,099

4 Claims. (Cl. 280—61)

This invention relates to trailers and more particularly to wheeled attachments for boats.

An object of the invention is to provide wheeled attachments for a boat that can be releasably secured thereto quickly and with an economy of effort, so that the boat can be coupled to a vehicle and drawn over land.

Another object is to provide a trailer device which has a wheel attachment member over which the boat can be resiliently mounted.

A further object is to provide wheeled attachments for boats comprised of elements that can be made and assembled at low cost.

These and other objects are accomplished by providing a wheel attachment member and attaching means to secure said member releasably to the boat. The wheel attachment member has an axle, a wheel rotatably mounted on the axle, a U-shaped member invertedly positioned having leg end portions which are bent and are rotatably secured on the axle with the wheel therebetween, a second U-shaped member invertedly positioned on the first U-shaped member and pivotally secured thereto adjacent its bent ends, a stop on one U-shaped member capable of acting on the other U-shaped member to limit the angle of rotation between them and springs between the U-shaped members acting to draw the top arched portions of the U-shaped members toward each other. The attaching means comprise a gunwale gripping element, a plate secured to the outer U-shaped member and having a cushioned face adapted to rest against the boat hull and two angles adapted to extend under the bottom of the boat to engage a rod secured to the boat bottom, and a turnbuckle flexibly connecting the top of the plate and the gunwale gripping element so that the boat can be held firmly between the gunwale gripping element and the bottom gripping angles when the turnbuckle is adjusted to draw the elements toward each other.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a perspective view showing the outside of the device on the side facing away from the boat when in functioning position.

Figures 4, 5:
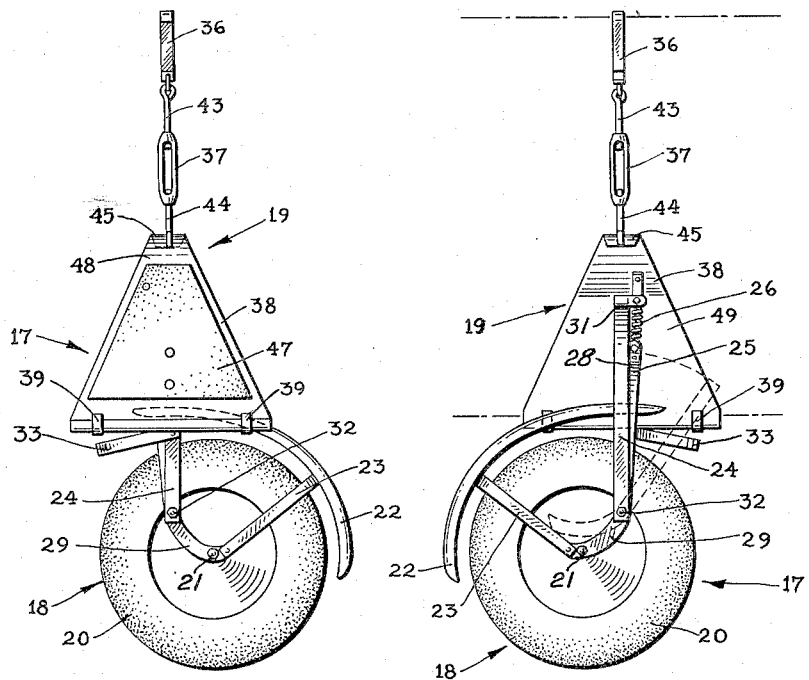
Figs. 4 and 5 are elevations of the boat facing and outside facing sides respectively of the device shown in Figs. 1 to 3 inclusive.
Figure 1:
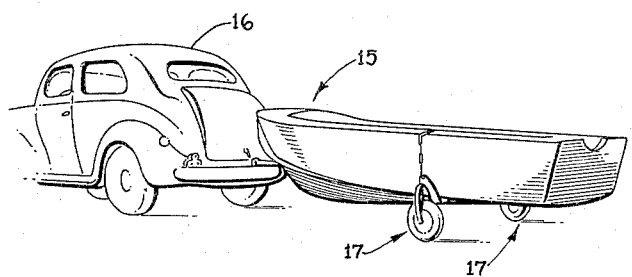
Fig. 1 is a perspective view of a boat trailer removably secured to an automobile, said trailer being provided with a pair of wheeled attachments constructed in accordance with the invention herein.
Figure 6:
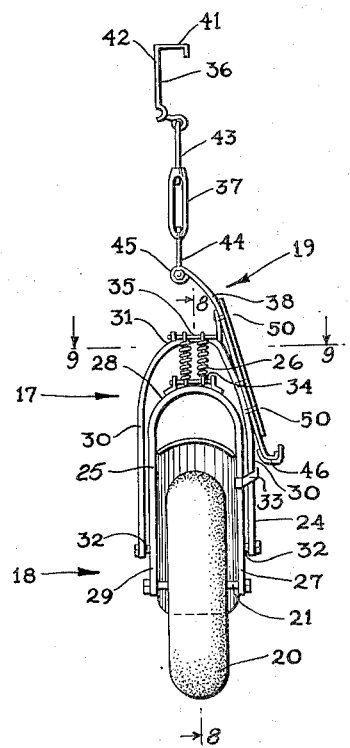
Fig. 6 is a rear elevation of the device with the mudguard removed to reveal construction details.
Figure 2:
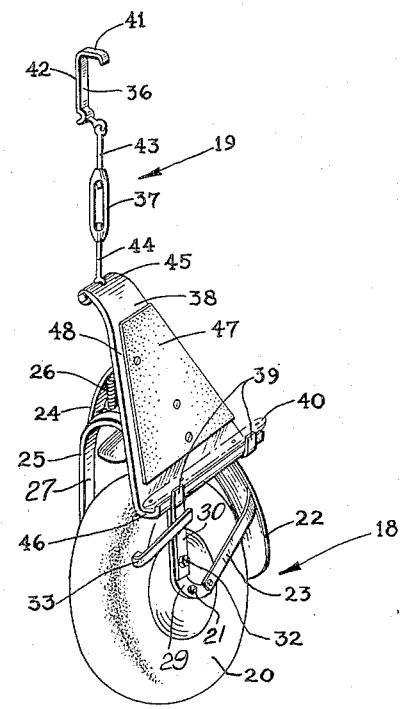
Fig. 2 is a perspective view of the device shown in Fig. 1, showing the side of the device facing the boat when in functioning position.
Figure 7:
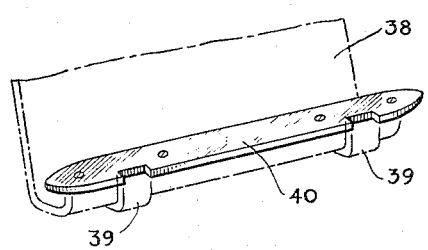
Fig. 7 is a perspective view of a rod element of the attaching means of the device which can be permanently secured to a boat, said rod being held by a gripping element shown in phantom.
Figure 7:
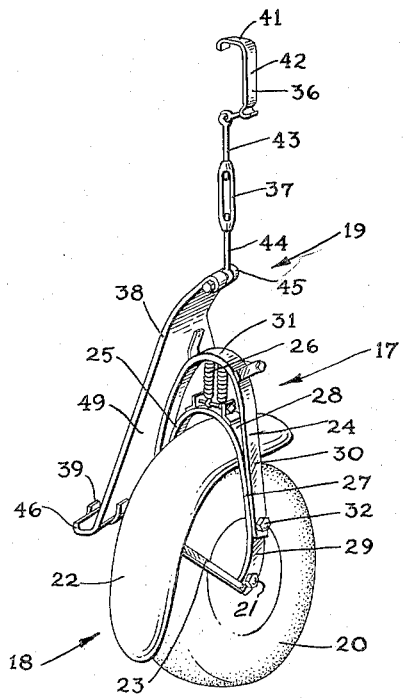
Figure 8:
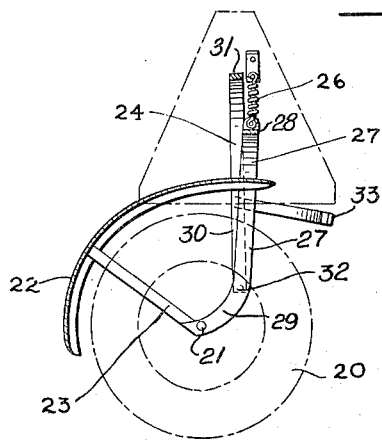
Fig. 8 is a vertical sectional view, taken on the line 8—8 of Fig. 6.
Figure 9:
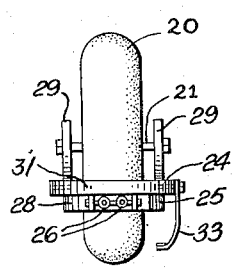
Fig. 9 is a horizontal sectional view, taken on the line 9—9 of Fig. 6.

In the drawings and in the specification, in which like reference numbers designate similar parts, a boat trailer 15 is removably secured to a vehicle such as the automobile 16, said trailer being provided with a pair of boat trailer mounting devices 17 which embody the invention herein.

The boat trailer mounting device 17 is comprised of a wheel attachment member 18 and boat attaching means 19 releasably securing the boat to the member 18.

The wheel attachment member consists of a wheel 20 rotatably mounted on an axle 21, a mudguard 22 retained in position over the wheel by a pair of braces 23 each of which is secured to an inner U-shaped member 25 adjacent the axle and extends to the side of and away from the wheel, an outer U-shaped member 24, an inner U-shaped member 25 and springs 26.

The inner U-shaped member 25 has two legs 27 and an arched connecting portion 28, each leg 27 being formed with an arcuate free end portion 29 opposite the connecting portion 28. The inner U-shaped member is rotatably mounted on the axle 21 in an inverted position, the wheel 20 and the mudguard 22 extending between the legs 27, the mudguard being disposed between the wheel and the arched connecting portion 28 of the inverted U-shaped member 25, and the arcuate end portions 29 of the legs 27 projecting to the rear, the axle extending through said curved portions 29 near their free termini.

The outer U-shaped member 24, which has straight legs 30 and an arched connecting portion 31, is invertedly disposed to the outside of the inner member 25 with the arched connecting portion 31 above the arched connecting portion 28 of the inner member 25, each leg 30 adjacent a leg 27 of the member 25.

Two pins 32 each extend through one of the outer member legs 30 adjacent its free end and through the adjacent inner member leg 27 at the point where its curved portion 29 begins to extend rearwardly to the axle, said pins rotatably joining the two U-shaped members to each other. A stop 33 is secured to one of the legs 30 of the outer member 24 and extends forwardly therefrom, terminating in a working end adapted to engage an edge of the adjacent leg 27 of the inner member 25 to limit the angle of rotation between the members. The springs 26 are cylindrical and extend between spring retaining plates 34 and 35 secured respectively to the arched portions 28 and 31 of the inverted U-shaped members, said springs acting to draw the two arched portions together.

The boat attaching means 19 consists of a gunwale gripping element or jaw 36, a turnbuckle 37, and a plate 38 having two angles 39 adapted to grip a rod 40 permanently secured to the bottom of a boat by screws or other securing means.

The gunwale gripping element 36 has a flanged arm 41 adapted to extend over the boat gunwale with the flange on the inside of the boat and extending downwardly, and an arm 42 rotatably joined at its end to the end of an upper turnbuckle rod 43, the lower turnbuckle rod 44 being rotatably secured at its lower end to the rolled over top 45 of the plate 38. The plate 38 is approximately trapezoidal in shape with the top 45 shorter than the bottom bent over edge or flange 46. Between its top and bottom edges, the plate is curved to conform to the contour of the sides of the hull of the boat.

The edges 45 and 46 are bent over in opposite directions, so that in functioning position, the upper edge 45 is rolled away from the boat, and the bottom bent over edge or flange 46 extends under the boat bottom with the angles 39 projecting beyond the edge 46 and adapted to engage the rod 40 which is secured to the boat bottom. A cushion 47 is secured to the face 48 of the plate 38 which in functioning position faces the boat, said cushion acting as a buffer to protect the adjacent boat surface.

The outer U-shaped member 24 is secured to face 49 of the plate 38 opposite its cushioned face by means of bolts 50 extending through one of the legs 30 of the U-shaped member and the plate 38.

The trailer mounting device is installed and functions as follows:

A device 17 is positioned alongside the boat abaft the beam, with the plate bottom flange 46 and its angles 39 engaging the rod 40 which is permanently secured to the boat bottom, and the cushion 47 resting against an adjacent portion of the hull between its bottom and its gunwale. The gunwale gripping element 36 is then engaged over the gunwale with the rotatable joints connecting the gripping element 36 with the turnbuckle rod 43, and the turnbuckle rod 44 with the plate 38, enabling the members to accommodate themselves to the contour of the hull. The turnbuckle 37 is then turned so that the boat is firmly but releasably held between the gunwale gripping element 36 and the angles 39. Similarly, a second device 17 is releasably secured to the boat so that the boat is supported on its port and starboard intermediate the bow and stern but nearer the stern, with the weight of the boat equally distributed between the devices 17.

The downward load is transmitted to the outer U-shaped members 24 which, being pivoted to the inner U-shaped members 25 at the pins 32 forward of the axles 21, tends to separate the U-shaped members rotatably against the action of the springs 26. Thus, the boat is resiliently mounted on the devices 17. Should the weight of the boat tend to rotate the U-shaped members too far relative to each other, the legs 27 of the inner members 25 engage the stops 33 of each device to limit the angle of rotation and to prevent the inner members 25 from riding down on the mudguards 22 and the wheels 20.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a boat mounting device having a plate for releasable attachment on the side of a boat, means for resiliently mounting a wheel on the plate, comprising a wheel having an axle extended from either side thereof, an inverted inner U-shaped member having an arcuate intermediate arm disposed above said wheel and legs extended downward on opposite sides of said wheel, said legs continuing at their bottom ends into rearwardly and downwardly curved portions having their free ends turnably connected to the extended ends of said axle, an inverted outer U-shaped member disposed over said inner U-shaped member with its arcuate intermediate arm disposed above and spaced from the intermediate arm of said inner U-shaped member and its legs depended downward along the outer faces of the legs of said inner U-shaped member, said legs of said outer U-shaped member having their free bottom ends pivotally connected to the legs of said inner U-shaped member slightly above the curved portions of the legs of said inner U-shaped member, said outer U-shaped member having one of its legs fixedly attached to said plate so that downward thrusts applied to said plate will be transferred to said outer U-shaped member and cause said inner U-shaped member to be pivoted forward about its pivotal connection with said axle, and resilient means between the spaced intermediate arms of said U-shaped members for retaining said U-shaped members engaged one within the other.

2. In a boat mounting device having a plate for releasable attachment on the side of a boat, means for resiliently mounting a wheel on the plate, comprising a wheel having an axle extended from either side thereof, an inverted inner U-shaped member having an arcuate intermediate arm disposed above said wheel and legs extended downward on opposite sides of said wheel, said legs continuing at their bottom ends into rearwardly and downwardly curved portions having their free ends turnably connected to the extended ends of said axle, an inverted outer U-shaped member disposed over said inner U-shaped member with its arcuate intermediate arm disposed above and spaced from the intermediate arm of said inner U-shaped member and its legs depended downward along the outer faces of the legs of said inner U-shaped member, said legs of said outer U-shaped member having their free bottom ends pivotally connected to the legs of said inner U-shaped member slightly above the curved portions of the legs of said inner U-shaped member, said outer U-shaped member having one of its legs fixedly attached to said plate so that downward thrusts applied to said plate will be transferred to said outer U-shaped member and cause said inner U-shaped member to be pivoted forward about its pivotal connection with said axle, and resilient means between the spaced intermediate arms of said U-shaped members for retaining said U-shaped members engaged one within the other, said resilient means comprising springs connected between the arched intermediate arms of said U-shaped members.

3. In a boat mounting device having a plate for releasable attachment on the side of a boat, means for resiliently mounting a wheel on the plate, comprising a wheel having an axle extended from either side thereof, an inverted inner U-shaped member having an arcuate intermediate arm disposed above said wheel and legs extended downward on opposite sides of said wheel, said legs continuing at their bottom ends into rearwardly and downwardly curved portions having their free ends turnably connected to the extended ends of said axle, an inverted outer U-shaped member disposed over said inner U-shaped member with its arcuate intermediate arm disposed above and spaced from the intermediate arm of said inner U-shaped member and its legs depended downward along the outer faces of the legs of said inner U-shaped member, said legs of said outer U-shaped member having their free bottom ends pivotally connected to the legs of said inner U-shaped member slightly above the curved portions of the legs of said inner U-shaped member, said outer U-shaped member having one of its legs fixedly attached to said plate so that downward thrusts applied to said plate will be transferred to said outer U-shaped member and cause said inner U-shaped member to be pivoted forward about its pivotal connection with said axle, resilient means between the spaced intermediate arms of said U-shaped members for retaining said U-shaped members engaged one within the other, and means on said outer U-shaped member limiting forward pivoting of said inner U-shaped member.

4. In a boat mounting device having a plate for releasable attachment on the side of a boat, means for resiliently mounting a wheel on the plate, comprising a wheel having an axle extended from either side thereof, an inverted inner U-shaped member having an arcuate intermediate arm disposed above said wheel and legs extended downward on opposite sides of said wheel, said legs continuing at their bottom ends into rearwardly and downwardly curved portions having their free ends turnably connected to the extended ends of said axle, an inverted outer U-shaped member disposed over said inner U-shaped member with its arcuate intermediate arm disposed above and spaced from the intermediate arm of said inner U-shaped member and its legs depended downward along the outer faces of the legs of said inner U-shaped member, said legs of said outer U-shaped member having their free bottom ends pivotally connected to the legs of said inner U-shaped member slightly above the curved portions of the legs of said inner U-shaped member, said outer U-shaped member having one of its legs fixedly attached to said plate so that downward thrusts applied to said plate will be transferred to said outer U-shaped member and cause said inner U-shaped member to be pivoted forward about its pivotal connection with said axle, and resilient means between the spaced intermediate arms of said U-shaped members for retaining said U-shaped members engaged one within the other, and a stop member mounted on one of the legs of said outer U-shaped member to be engaged by the adjacent leg of said inner U-shaped member to limit forward pivoting of said inner U-shaped member.

MARCEL RAVEAU.

REFERENCES CITED

The following references are of record in the file of this patent:

UNITED STATES PATENTS

| Number | Name | Date |
|---|---|---|
| 235,302 | Schuchardt | Dec. 7, 1880 |
| 928,242 | Bollbach et al. | July 20, 1909 |
| 1,939,863 | Seiter | Dec. 19, 1933 |
| 2,086,721 | Martins | July 13, 1937 |
| 2,171,889 | Payson | Sept. 5, 1939 |
| 2,203,392 | Pica | June 4, 1940 |
| 2,339,782 | Johnson | Jan. 25, 1944 |
| 2,424,641 | Swanson | July 29, 1947 |